May 15, 1923.

F. J. ANDEL 1,455,562

OUTSIDE BRAKE BRACKET

Filed May 22, 1922

WITNESSES
F. R. Walker
S. W. Foster

INVENTOR
Frank J. Andel.
BY Munn &co.
ATTORNEYS

Patented May 15, 1923.

1,455,562

UNITED STATES PATENT OFFICE.

FRANK J. ANDEL, OF CLEVELAND, OHIO.

OUTSIDE BRAKE BRACKET.

Application filed May 22, 1922. Serial No. 562,789.

*To all whom it may concern:*

Be it known that I, FRANK J. ANDEL, a citizen of the United States, and a resident of Cleveland, in the county of Cuyahoga and State of Ohio, have invented a new and improved Outside Brake Bracket, of which the following is a full, clear, and exact description.

This invention relates to improvements in outside brake brackets, an object of the invention being to provide an improved construction of bracket which can be conveniently attached to the brake disk of a car, which will function as a connecting means for the brake band and also as a guide for the rod connecting the ends of the brake band, and in addition will function to prevent lateral displacement of the brake band.

A further object is to provide a bracket which is especially adapted for use in connection with my improved outside brake, disclosed in my pending application Serial No. 556,973, filed April 27, 1922.

With these and other objects in view, the invention consists in certain novel features of construction and combinations, and arrangement of parts, as will be more fully hereinafter described and pointed out in the claims.

In the accompanying drawings—

Figure 1:
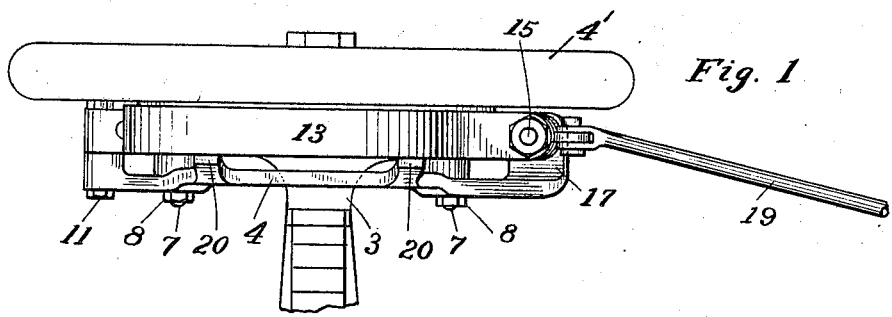
Figure 1 is a fragmentary plan view illustrating my improved bracket in operative position.
Figure 2:
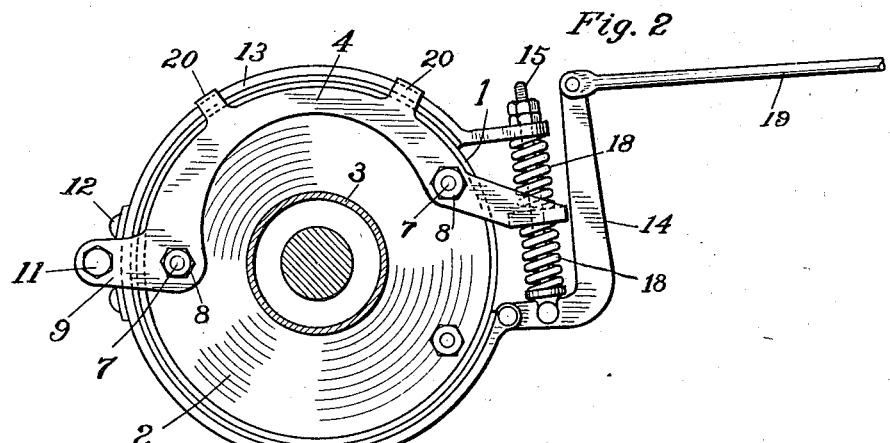
Figure 2 is a sectional elevation showing the bracket and brake mechanism with the wheel and other parts removed.
Figure 3:
Figure 3 is a top plan view of my improved bracket.
Figure 4:
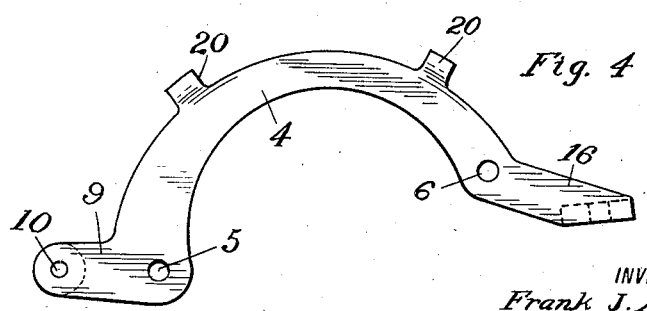
Figure 4 is a view in side elevation of the bracket.

1 represents a brake drum, 2 a brake disk, 3 an axle housing, and 4' a wheel, all of which are of the type common in cars in general use.

My improved bracket 4 is provided with bolt openings 5 and 6 to receive the ordinary bolts 7 on the disk 2, and held in position by nuts 8. In other words, in order to attach my improved bracket 4, it is simply necessary to employ the parts on the standard brake mechanism of cars by simply removing the nuts 8 and positioning the bracket 4 on the bolts 7. The bracket 4 is arched or curved throughout its intermediate portion, and at its rear end is made with an integral arm 9 having a bolt opening 10 to receive a bolt 11 which couples the arm 9 to a bracket 12 fixed to the intermediate portion of a brake band 13.

An angle lever 14 is pivotally connected to one end of the brake band 13, and a rod 15 couples the shorter member of the lever 14 with the other end of brake band 13.

My improved bracket 4 is provided at its forward end with an arm 16 having a laterally projecting perforated lug 17 thereon, through which the rod 15 projects and coil springs 18 are located on the rod 15, at opposite sides to lug 17, and serve to maintain the band expanded.

19 represents an operating rod which is shown most clearly in Figure 1 as located at an angle to the longitudinal plane of the bracket mechanism so that when a forward pull is had on the rod 19, it has a tendency to exert a lateral stress on the brake band, which tends to draw the brake band laterally of the drum. To prevent any possibility of this lateral displacement, I provide laterally offset lugs 20 on the bracket 4, which serve as shoulders or guides, to engage the edge of the brake band 13 and prevent lateral displacement.

It will thus be noted that my improved bracket has three separate and distinct functions. First, it is connected directly with the intermediate portion of the brake band; second, it acts as a guide for the rod 15 and third, it prevents lateral displacement of the brake band.

While I have described one bracket 14 in connection with a single brake mechanism, it is to be understood of course, that with a pair of such brake mechanisms, brackets will be made right and left, but in other respects will be precisely alike.

Various slight changes might be made in the general form and arrangement of the parts, described, without departing from my invention, and hence I do not limit myself to the precise details set forth, but consider myself at liberty to make such changes and alterations as fairly fall within the spirit and scope of the appended claims.

I claim:

1. A bracket of the character described, having forwardly and rearwardly projecting arms at its respective ends, one of said arms adapted to be connected to a brake band, a laterally projecting perforated lug on the other arm adapted to guide a rod connecting the ends of the brake band, and means on the bracket for preventing lateral movement of the brake band.

2. A bracket of the character described, having arms at its forward and rear ends, said rear arm adapted to be connected to the intermediate portion of the brake band, a perforated laterally projecting lug on the forward arm adapted to receive a rod connecting the ends of the brake band, and a laterally offset lug on said bracket adapted to engage the edge of a brake band to prevent lateral displacement thereof.

3. The combination, with a brake drum, a brake disk, a brake band on the drum, a brake operating means exerting a pull at an angle to the longitudinal plane of the brake drum, and a brake band on the drum, of a bracket fixed to the disk, a rearwardly projecting arm on the bracket connected to the intermediate portion of the brake band, a forwardly projecting arm on the bracket, a laterally projecting perforated lug on said last mentioned arm, an angle arm pivotally connected to one end of the band, a rod connecting the shorter member of said angle arm with the other end of the brake band and projecting through the perforated lug, springs on the rod at opposite sides of the lug, and a pair of laterally offset lugs on the bracket adapted to engage the edge of the brake band and prevent lateral displacement thereof.

FRANK J. ANDEL.